(12) United States Patent
Takahashi et al.

(10) Patent No.: US 10,958,408 B2
(45) Date of Patent: *Mar. 23, 2021

(54) TRANSMIT-AND-RECEIVE MODULE

(71) Applicant: Murata Manufacturing Co., Ltd., Kyoto (JP)

(72) Inventors: Hidetaka Takahashi, Kyoto (JP); Syunji Yoshimi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 197 days.

This patent is subject to a terminal disclaimer.

(21) Appl. No.: 16/223,455

(22) Filed: Dec. 18, 2018

(65) Prior Publication Data

US 2019/0123888 A1 Apr. 25, 2019

Related U.S. Application Data

(63) Continuation of application No. 15/718,599, filed on Sep. 28, 2017, now Pat. No. 10,187,194.

(30) Foreign Application Priority Data

Sep. 30, 2016 (JP) .............................. JP2016-193894

(51) Int. Cl.
| | |
|---|---|
| *H04L 5/14* | (2006.01) |
| *H04B 1/525* | (2015.01) |
| *H04B 1/00* | (2006.01) |
| *H04B 1/50* | (2006.01) |
| *H04W 88/06* | (2009.01) |

(52) U.S. Cl.
CPC ......... *H04L 5/1461* (2013.01); *H04B 1/0067* (2013.01); *H04B 1/50* (2013.01); *H04B 1/525* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 10,187,194 B2* | 1/2019 | Takahashi | ............. H04W 88/06 |
| 2013/0315116 A1 | 11/2013 | Chen | |
| 2015/0295596 A1* | 10/2015 | Wloczysiak | .............. H04L 5/08 370/297 |
| 2016/0094331 A1 | 3/2016 | White et al. | |
| 2017/0026064 A1* | 1/2017 | Khlat | ................... H04B 1/0458 |
| 2017/0094662 A1 | 3/2017 | Ebihara et al. | |

FOREIGN PATENT DOCUMENTS

JP 2015-204629 A 11/2015

\* cited by examiner

*Primary Examiner* — Mohammad S Adhami
(74) *Attorney, Agent, or Firm* — Pearne & Gordon LLP

(57) ABSTRACT

A transmit-and-receive module includes a power amplifier, a low-noise amplifier, first and second phase shifter circuits, and a correction circuit. The power amplifier amplifies power of first and second transmit signals. The low-noise amplifier amplifies first and second received signals without increasing noise. The first and second phase shifter circuits adjust impedance for the first received signal and that for the second received signal. The correction circuit supplies a canceling signal to an output node of the second phase shifter circuit. The canceling signal is used for canceling the first transmit signal passing through a receive filter.

11 Claims, 3 Drawing Sheets

TRANSMIT-AND-RECEIVE MODULE

This application is a continuation of U.S. patent application Ser. No. 15/718,599 filed on Sep. 28, 2017, which claims priority from Japanese Patent Application No. 2016-193894 filed on Sep. 30, 2016. The content of these applications are incorporated herein by reference in their entireties.

BACKGROUND

The present disclosure relates to a transmit-and-receive module. As a technology for improving the communication speed in a mobile communication terminal, such as a cellular phone, carrier aggregation is known in which signals are simultaneously transmitted and received by using aggregated multiple component carriers having different frequency bands as a single communication line. Japanese Unexamined Patent Application Publication No. 2015-204629 discloses, as shown in FIG. 8 therein, a receiving circuit for simultaneously receiving a signal of a first frequency band and a signal of a second frequency band by utilizing carrier aggregation. This receiving circuit includes a first filter which uses the first frequency band as a pass band and a second filter which uses the second frequency band as a pass band. A first path is disposed between the output node of the first filter and the input node of a low-noise amplifier. The first path substantially provides matching impedance to a signal of the first frequency band and substantially provides open-circuit impedance to a signal of the second frequency band. A second path is disposed between the output node of the second filter and the input node of the low-noise amplifier. The second path substantially provides matching impedance to a signal of the second frequency band and substantially provides open-circuit impedance to a signal of the first frequency band. With this circuit configuration, a signal of the first frequency band is input into the low-noise amplifier via the first path, while a signal of the second frequency band is input into the low-noise amplifier via the second path. This makes it possible to simultaneously receive a signal of the first frequency band and a signal of the second frequency band.

BRIEF SUMMARY

After a transmit signal is amplified by a power amplifier, a certain portion (in particular, a side lobe portion) of the transmit signal is attenuated by a transmit filter. However, this portion may not sufficiently be attenuated and pass through a receive filter, and may be superimposed on a received signal. This may likely occur when the band of a transmit signal is close to the band of a received signal and when downlink carrier aggregation and uplink carrier aggregation are simultaneously operated. A transmit signal superimposed on a received signal acts as noise for the received signal and may decrease the sensitivity of the received signal.

Accordingly, the present disclosure suppresses a decrease in the sensitivity of a received signal caused by a transmit signal superimposed on the received signal.

According to embodiments of the present disclosure, there is provided a transmit-and-receive module including: (i) a power amplifier that amplifies power of first and second transmit signals; (ii) a low-noise amplifier that amplifies first and second received signals; (iii) a first receive filter having frequency characteristics in which a frequency band of the first received signal is used as a pass band, while a frequency band of the first transmit signal is used as an elimination band; (iv) a second receive filter having frequency characteristics in which a frequency band of the second received signal is used as a pass band, while a frequency band of the second transmit signal is used as an elimination band; (v) a first phase shifter circuit including a first input node and a first output node, the first input node being connected to an output node of the first receive filter, the first output node being connected to an input node of the low-noise amplifier, the first phase shifter circuit adjusting impedance for the first received signal and impedance for the second received signal so that the impedance for the first received signal at the first output node will coincide with matching impedance and so that the impedance for the second received signal at the first output node will coincide with open-circuit impedance or short-circuit impedance; (vi) a second phase shifter circuit including a second input node and a second output node, the second input node being connected to an output node of the second receive filter, the second output node being connected to the input node of the low-noise amplifier, the second phase shifter circuit adjusting impedance for the first received signal and impedance for the second received signal so that the impedance for the second received signal at the second output node will coincide with matching impedance and so that the impedance for the first received signal at the second output node will coincide with open-circuit impedance or short-circuit impedance; and (vii) a correction circuit that supplies a canceling signal to the second output node of the second phase shifter circuit, the canceling signal being used for canceling the first transmit signal passing through the second receive filter.

According to embodiments of the present disclosure, it is possible to suppress a decrease in the sensitivity of a second received signal caused by a first transmit signal superimposed on the second received signal.

Other features, elements, and characteristics of the present disclosure will become more apparent from the following detailed description of embodiments of the present disclosure with reference to the attached drawings.

DETAILED DESCRIPTION

Figure 1:
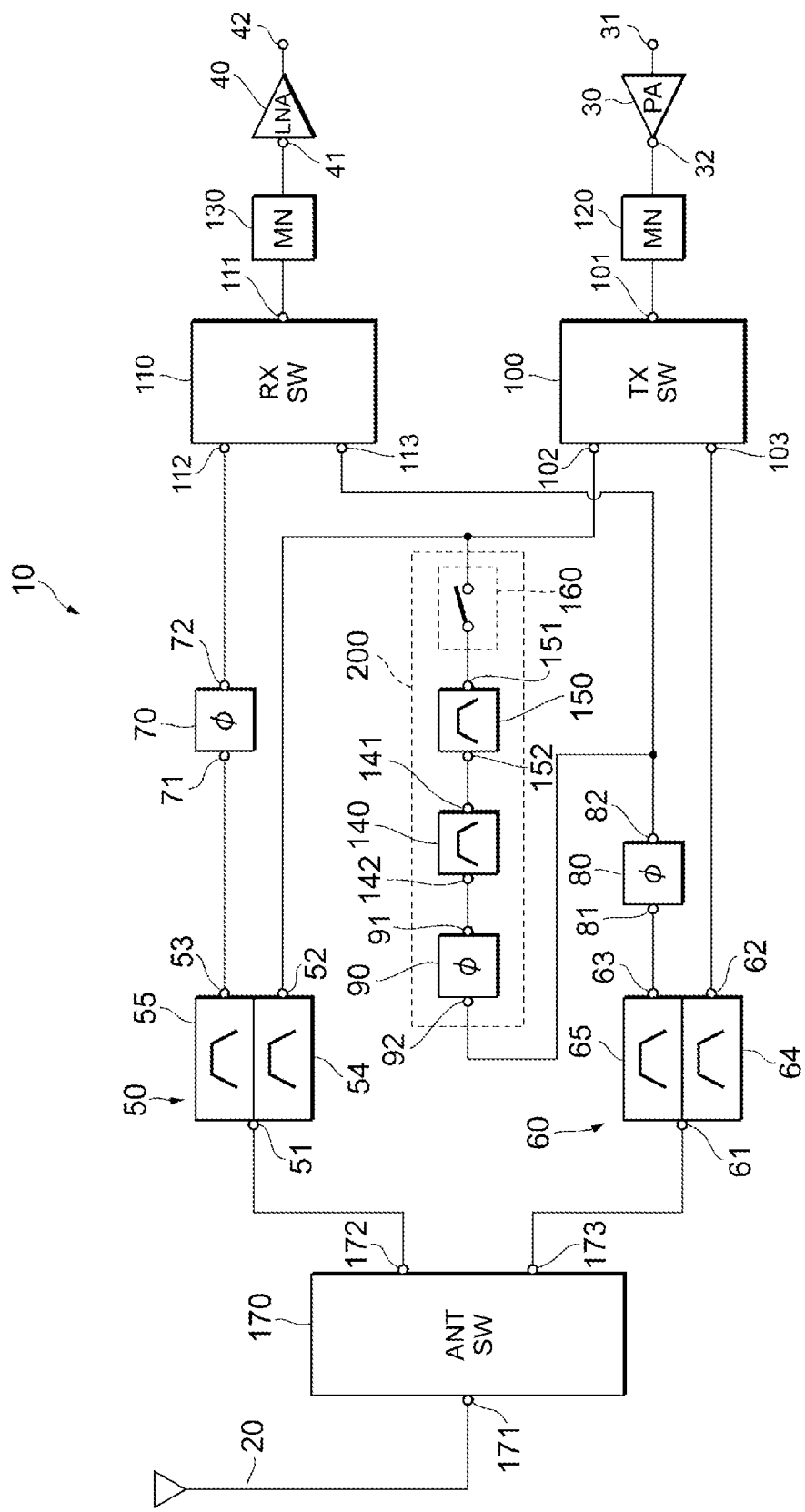
FIG. 1 is a schematic diagram illustrating the circuit configuration of a transmit-and-receive module according to an embodiment of the disclosure.

Embodiments of the present disclosure will be described below with reference to the accompanying drawings. The same circuit element is designated by like reference numeral, and the same explanation thereof will not be repeated.

FIG. 1 is a schematic diagram illustrating the circuit configuration of a transmit-and-receive module 10 according to an embodiment of the disclosure. The transmit-and-receive module 10 is used in a mobile communication device, such as a cellular phone, and performs signal processing for transmitting and receiving a radio frequency (RF) signal to and from a base station. The transmit-and-receive module 10 includes a power amplifier (PA) 30, a low-noise amplifier (LNA) 40, duplexers 50 and 60, a phase shifter circuit 70 (first phase shifter circuit), a phase shifter circuit 80 (second phase shifter circuit), and a correction circuit 200. The transmit-and-receive module 10 supports communication standards, such as High-Speed Uplink Packet Access (HSUPA) and Long Term Evolution (LTE).

First and second transmit signals are input into an input node 31 of the power amplifier 30. The first and second transmit signals are RF signals having different frequency bands. These RF signals are obtained by modulating carrier waves in accordance with information indicating a baseband signal that can be subjected to digital signal processing. The power amplifier 30 amplifies power of the first and second transmit signals input into the input node 31 and outputs the amplified signals from an output node 32.

A transmit-signal changing switch 100 includes an input node 101 and output nodes 102 and 103. The first transmit signal is input from the power amplifier 30 into the input node 101. The transmit-signal changing switch 100 selectively outputs the first transmit signal from the output node 102. The second transmit signal is input from the power amplifier 30 into the input node 101. The transmit-signal changing switch 100 selectively outputs the second transmit signal from the output node 103.

The duplexer 50 includes a common node 51, a transmit node 52, a receive node 53, a transmit filter 54 (first transmit filter), and a receive filter 55 (first receive filter). The common node 51 is connected to a node 172 of an antenna switch 170. The transmit node 52 is connected to the output node 102 of the transmit-signal changing switch 100. The receive node 53 is connected to an input node 112 of a received-signal changing switch 110 via the phase shifter circuit 70. The transmit filter 54 has frequency characteristics in which the frequency band of the first transmit signal input from the power amplifier 30 and output to an antenna 20 via the transmit node 52 and the common node 51 is used as a pass band, while the frequency band of a first received signal is used as an elimination band. The receive filter 55 has frequency characteristics in which the frequency band of the first received signal input from the antenna 20 and output to the low-noise amplifier 40 via the common node 51 and the receive node 53 is used as a pass band, while the frequency band of the first transmit signal is used as an elimination band. With the frequency characteristics of the transmit filter 54 and the receive filter 55, the duplexer 50 can isolate the first transmit signal to be output to the antenna 20 and the first received signal to be output to the low-noise amplifier 40 from each other. The first transmit signal and the first received signal are RF signals having different frequency bands.

The duplexer 60 includes a common node 61, a transmit node 62, a receive node 63, a transmit filter 64 (second transmit filter), and a receive filter 65 (second receive filter). The common node 61 is connected to a node 173 of the antenna switch 170. The transmit node 62 is connected to the output node 103 of the transmit-signal changing switch 100. The receive node 63 is connected to an input node 113 of the received-signal changing switch 110 via the phase shifter circuit 80. The transmit filter 64 has frequency characteristics in which the frequency band of the second transmit signal input from the power amplifier 30 and output to the antenna 20 via the transmit node 62 and the common node 61 is used as a pass band, while the frequency band of a second received signal is used as an elimination band. The receive filter 65 has frequency characteristics in which the frequency band of the second received signal input from the antenna 20 and output to the low-noise amplifier 40 via the common node 61 and the receive node 63 is used as a pass band, while the frequency band of the second transmit signal is used as an elimination band. With the frequency characteristics of the transmit filter 64 and the receive filter 65, the duplexer 60 can isolate the second transmit signal to be output to the antenna 20 and the second received signal to be output to the low-noise amplifier 40 from each other. The second transmit signal and the second received signal are RF signals having different frequency bands.

The received-signal changing switch 110 includes the input nodes 112 and 113 and an output node 111. The first received signal is input from the duplexer 50 into the input node 112. The received-signal changing switch 110 selectively outputs the first received signal from the output node 111. The second received signal is input from the duplexer 60 into the input node 113. The received-signal changing switch 110 selectively outputs the second received signal from the output node 111. The received-signal changing switch 110 is able to simultaneously output the first and second received signals from the output node 111 by utilizing carrier aggregation. The first and second received signals selectively output from the output node 111 are input into an input node 41 of the low-noise amplifier 40.

The low-noise amplifier 40 amplifies the first and second received signals without necessarily increasing noise, and outputs the amplified signals from an output node 42. The first and second received signals are then demodulated into baseband signals.

The antenna switch 170 includes a node 171 connected to the antenna 20, the node 172 connected to the common node 51 of the duplexer 50, and the node 173 connected to the common node 61 of the duplexer 60. The antenna switch 170 selectively establishes paths for the first transmit signal, the first received signal, the second transmit signal, and the second received signal between the node 171 and the nodes 172 and 173.

A matching circuit 120 performs impedance matching between the output node 32 of the power amplifier 30 and the input node 101 of the transmit-signal changing switch 100. A matching circuit 130 performs impedance matching between the input node 41 of the low-noise amplifier 40 and the output node 111 of the received-signal changing switch 110.

The transmit-and-receive module 10 is capable of simultaneously receiving the first and second received signals by utilizing carrier aggregation. The first and second received signals are thus simultaneously input into the common node 51 of the duplexer 50 from the node 172 of the antenna switch 170. The first and second received signals are also simultaneously input into the common node 61 of the duplexer 60 from the node 173 of the antenna switch 170.

An input node 71 (first input node) of the phase shifter circuit 70 is connected to the receive node 53 of the duplexer 50. An output node 72 (first output node) of the phase shifter circuit 70 is connected to the input node 112 of the received-signal changing switch 110. The phase shifter circuit 70 adjusts impedance for the first received signal so that the impedance for the first received signal at the output node 72 will coincide with matching impedance. The phase shifter circuit 70 also adjusts impedance for the second received signal so that the impedance for the second received signal at the output node 72 will coincide with open-circuit impedance or short-circuit impedance. This makes the reflection coefficient of the first received signal at the output node 72 of the phase shifter circuit 70 about zero and makes the reflection coefficient of the second received signal at the output node 72 about ±1. As a result, the first received signal is input into the input node 41 of the low-noise amplifier 40 via the phase shifter circuit 70, while the second received signal is reflected at the output node 72 after passing through the receive filter 55.

An input node 81 (second input node) of the phase shifter circuit 80 is connected to the receive node 63 of the duplexer 60. An output node 82 (second output node) of the phase shifter circuit 80 is connected to the input node 113 of the received-signal changing switch 110. The phase shifter circuit 80 adjusts impedance for the second received signal so that the impedance for the second received signal at the output node 82 will coincide with matching impedance. The phase shifter circuit 80 also adjusts impedance for the first received signal so that the impedance for the first received signal at the output node 82 will coincide with open-circuit impedance or short-circuit impedance. This makes the reflection coefficient of the second received signal at the output node 82 of the phase shifter circuit 80 about zero and makes the reflection coefficient of the first received signal at the output node 82 about ±1. As a result, the second received signal is input into the input node 41 of the low-noise amplifier 40 via the phase shifter circuit 80, while the first received signal is reflected at the output node 82 after passing through the receive filter 65.

Figure 2:
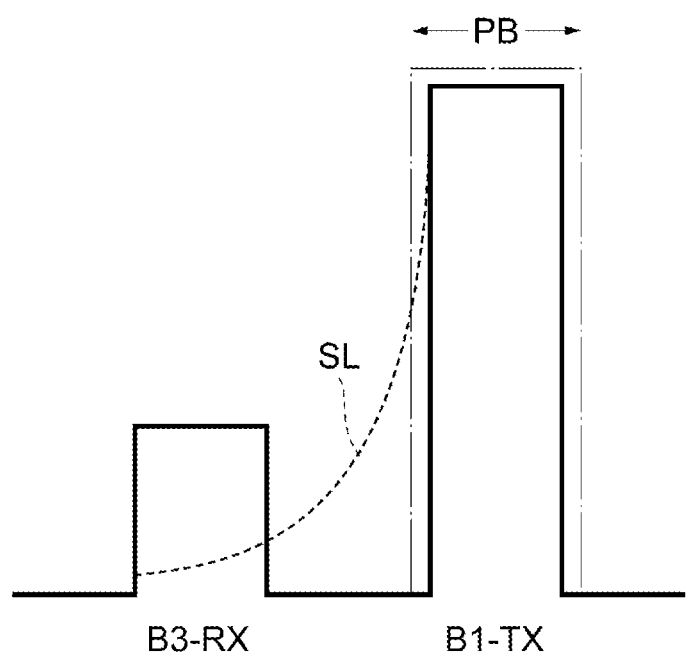
FIG. 2 is a diagram for explaining a reason why the sensitivity of a received signal is decreased.

A decrease in the sensitivity of the second received signal will be discussed below with reference to FIG. 2. In FIG. 2, B1-TX indicates the frequency band (about 1920 to 1980 MHz, for example) of the first transmit signal, while B3-RX indicates the frequency band (about 1805 to 1880 MHz, for example) of the second received signal. PB indicates the pass band of the transmit filter 54. SL indicates a side lobe portion of the first transmit signal. A portion (in particular, a side lobe portion) of the first transmit signal to be attenuated by the transmit filter 54 may not sufficiently be attenuated and pass through the receive filter 65. Then, the side lobe portion SL of the first transmit signal is superimposed on the second received signal and acts as noise, thereby decreasing the sensitivity of the second received signal. This is likely to occur when the frequency band B1-TX of the first transmit signal and the frequency band B3-RX of the second received signal are close to each other.

Referring back to FIG. 1, the correction circuit 200 generates a canceling signal for canceling a portion of the first transmit signal which has not sufficiently been attenuated by the transmit filter 54 and passed through the receive filter 65. The correction circuit 200 supplies the canceling signal to the output node 82 of the phase shifter circuit 80 so as to remove the first transmit signal superimposed on the second received signal. It is thus possible to suppress a decrease in the sensitivity of the second received signal. The correction circuit 200 includes a switch 160, a filter 140 (first filter), and a phase shifter circuit (third phase shifter circuit) 90. The filter 140 includes an input node 141. The input node 141 is selectively connected to or disconnected from a path between the output node 102 of the transmit-signal changing switch 100 and the transmit node 52 of the duplexer 50 in accordance with the opening and closing of the switch 160. The filter 140 selectively receives the first transmit signal output from the output node 102 of the transmit-signal changing switch 100. The opening and closing of the switch 160 is controlled based on a control signal from a baseband integrated circuit (IC) which processes a baseband signal, for example. The opening and closing of the switch 160 may alternatively be controlled based on a control signal from a radio frequency integrated circuit (RFIC) which modulates and demodulates a RF signal. The filter 140 has substantially the same frequency characteristics as those of the receive filter 65. The phase and the level of the first transmit signal passing through the filter 140 are similar to those of the first transmit signal passing through the receive filter 65. The phase shifter circuit 90 includes an input node 91 (third input node) connected to an output node 142 of the filter 140 and an output node 92 (third output node) connected to the output node 82 of the phase shifter circuit 80. The phase shifter circuit 90 adjusts the phase of the first transmit signal passing through the filter 140 so that the phase of the first transmit signal at the output node 82 after passing through the receive filter 65 will be opposite to the phase of the first transmit signal at the output node 92 after passing through the filter 140. As a result, a canceling signal is generated from the first transmit signal passing through the filter 140 and the phase shifter circuit 90.

The correction circuit 200 may also include a filter 150 (second filter). The filter 150 includes an input node 151. The input node 151 is selectively connected to or disconnected from a path between the output node 102 of the transmit-signal changing switch 100 and the transmit node 52 of the duplexer 50 in accordance with the opening and closing of the switch 160. The filter 150 selectively receives the first transmit signal output from the output node 102 of the transmit-signal changing switch 100. The filter 150 has substantially the same frequency characteristics as those of the transmit filter 54. An output node 152 of the filter 150 is connected to the input node 141 of the filter 140. With the provision of the filter 150, the absolute value of a level of the first transmit signal at the output node 82 after passing through the receive filter 65 becomes substantially the same as that of a level of the first transmit signal at the output node 92 after passing through the two filters 140 and 150. As a result, a high-precision canceling signal is generated from the first transmit signal passing through the two filters 140 and 150 and the phase shifter circuit 90.

However, the provision of the filter 150 is not necessarily essential. If the phase shifter circuit 90 has frequency characteristics in which the first transmit signal passing through the filter 140 can suitably be attenuated, the provision of the filter 150 may be omitted. It is desirable that the frequency characteristics of the phase shifter circuit 90 be those in which the absolute value of a level of the first transmit signal at the output node 82 after passing through the receive filter 65 becomes substantially the same as that of the first transmit signal at the output node 92 after passing through the filter 140 and the phase shifter circuit 90.

Figure 3:
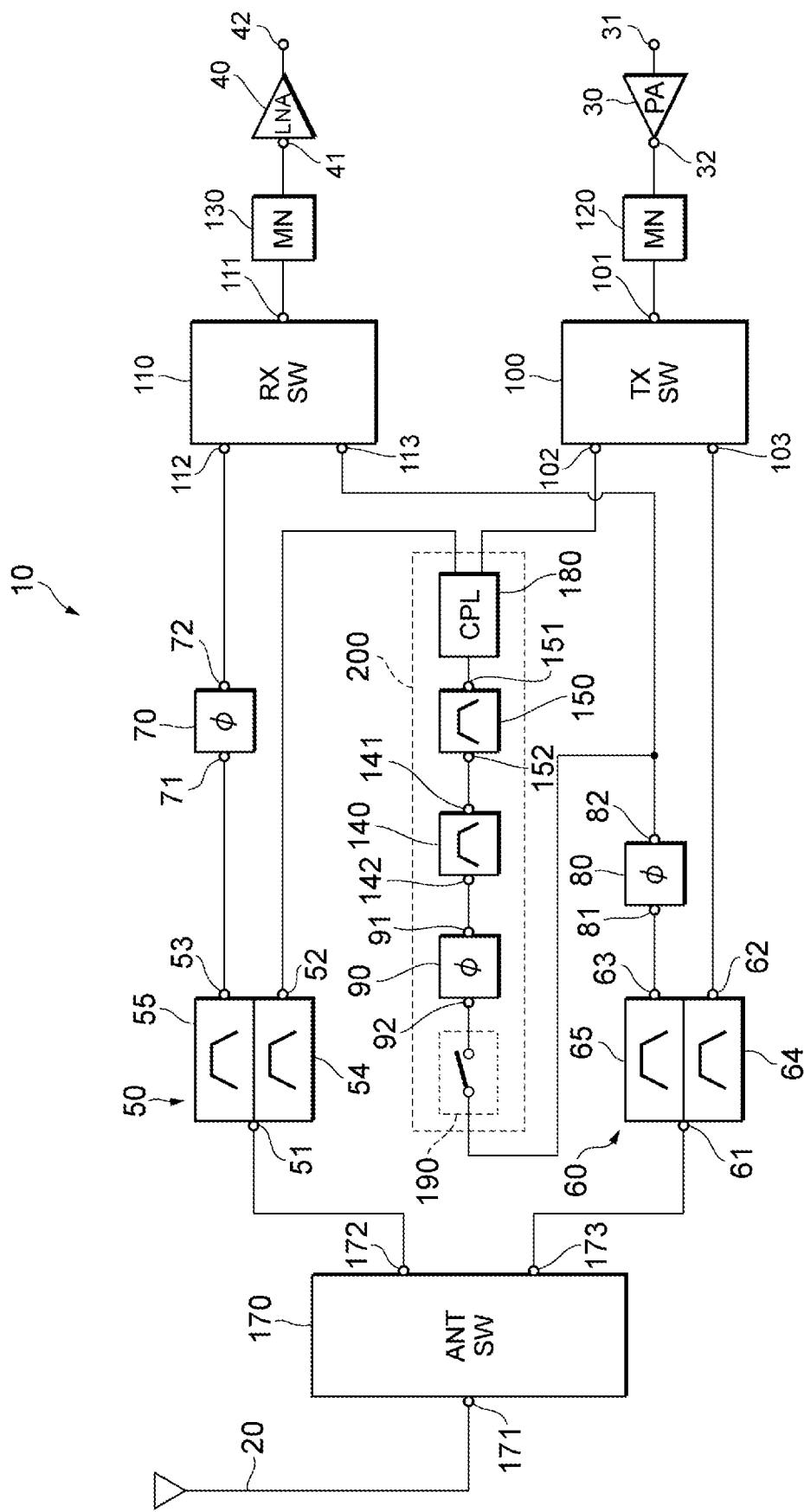
FIG. 3 is a schematic diagram illustrating the circuit configuration of a transmit-and-receive module according to an embodiment of the disclosure.

In the above-described embodiment, the correction circuit 200 selectively receives the first transmit signal output from the output node 102 of the transmit-signal changing switch 100 via the switch 160. However, the correction circuit 200 is not restricted to the configuration shown in FIG. 1. Alternatively, the correction circuit 200 may include a coupler (CPL) 180, filters 140 and 150, a phase shifter circuit 90, and a switch 190, as shown in FIG. 3. The first transmit signal output from the output node 102 of the transmit-signal changing switch 100 is input into the correction circuit 200 via the coupler 180. The switch 190 is disposed between the phase shifter circuits 90 and 80. The correction circuit 200 selectively supplies a canceling signal to the output node 82 of the phase shifter circuit 80 in accordance with the opening and closing of the switch 190. The opening and closing of the switch 190 is controlled based on a control signal from a baseband IC or a RFIC.

In the above-described embodiment, a canceling signal for canceling the first transmit signal passing through the receive filter 65 is supplied to the output node 82 of the phase shifter circuit 80, thereby removing the first transmit signal superimposed on the second received signal. It is thus possible to suppress a decrease in the sensitivity of the second received signal. A canceling signal can be generated from the first transmit signal passing through the filter 140 and the phase shifter circuit 90. If the phase shifter circuit 90 has frequency characteristics in which the first transmit signal can suitably be attenuated, a high-precision canceling signal can be generated from the first transmit signal passing through the filter 140 and the phase shifter circuit 90. Alternatively, a high-precision canceling signal may be generated from the first transmit signal passing through the two filters 140 and 150 and the phase shifter circuit 90. As described above, the sensitivity of the second received signal is decreased because of the first transmit signal superimposed on the second received signal. This is likely to occur particularly when the frequency band of the first transmit signal and that of the second received signal are close to each other. Removing of the first transmit signal superimposed on the second received signal by using a canceling signal is thus effective in this situation.

The above-described embodiments are provided for facilitating the understanding of the invention, but are not intended to be exhaustive or to limit the invention to the precise forms disclosed. Modifications and/or improvements may be made without departing from the scope and spirit of the invention, and equivalents of the invention are also encompassed in the invention. That is, suitable design changes made to the embodiments by those skilled in the art are also encompassed in the invention within the scope and spirit of the invention. For example, the elements of the embodiments and the positions, materials, conditions, configurations, and sizes thereof are not restricted to those described in the embodiments and may be changed in an appropriate manner. For example, the meaning of "a circuit element A is connected to a circuit element B" includes, not only a case in which the circuit element A is directly connected to the circuit element B, but also a case in which a signal path is selectively established between the circuit element A and the circuit element B via a circuit element C (a switch element, for example). Additionally, the positional relationships such as the vertical and horizontal positional relationships between elements are not restricted by the dimensional ratios of the elements illustrated in the drawings, unless otherwise stated. The elements of the embodiments may be combined within a technically possible range, and configurations obtained by combining the elements of the embodiments are also encompassed in the invention within the scope and spirit of the invention.

While embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A transmit-and-receive module, operating simultaneously downlink carrier aggregation and uplink carrier aggregation, comprising:
    a power amplifier that amplifies a first transmission signal in a first transmission band;
    a first transmission filter that passes frequencies in the first transmission band;
    a low-noise amplifier that amplifies a first received signal in a first reception band, the first reception band being different from the first transmission band;
    a first reception filter that passes frequencies in the first reception band;
    a first phase shifter circuit connected between the first reception filter and the low-noise amplifier, wherein the first received signal is input to an input node of the first phase shifter circuit and the first received signal is output from an output node of the first phase shifter circuit; and
    a correction circuit that generates a canceling signal that cancels at least a portion of the first transmission signal, wherein the correction circuit outputs the canceling signal to the output node of the first phase shifter circuit.

2. The transmit-and-receive module according to claim 1, wherein the first transmission band is adjacent to the first reception band.

3. The transmit-and-receive module according to claim 1, further comprising a second transmission filter, wherein:
    the power amplifier amplifies a second transmission signal in a second transmission band, and
    the second transmission filter passes frequencies in the second transmission band.

4. The transmit-and-receive module according to claim 3, further comprising a duplexer that includes the second transmission filter and the first reception filter.

5. The transmit-and-receive module according to claim 1, further comprising a second reception filter, wherein:
    the low-noise amplifier amplifies a second received signal in a second reception band, and
    the second reception filter passes frequencies in the second reception band.

6. The transmit-and-receive module according to claim 5, further comprising a duplexer that includes the first transmission filter and the second reception filter.

7. The transmit-and-receive module according to claim 3, further comprising a second reception filter, wherein:
    the low-noise amplifier amplifies a second received signal in a second reception band, and
    the second reception filter passes frequencies in the second reception band.

8. The transmit-and-receive module according to claim 7, further comprising a duplexer that includes the first transmission filter and the second reception filter.

9. The transmit-and-receive module according to claim 5, further comprising a second phase shifter circuit, wherein:
    the second phase shifter circuit is connected between the second reception filter and the low-noise amplifier, and
    the second received signal is input to an input node of the second reception filter and the second received signal is output from an output node of the second reception filter.

10. The transmit-and-receive module according to claim 1, further comprising a reception switch connected between the first phase shifter circuit and the low-noise amplifier, wherein the correction circuit outputs the canceling signal to the output node of the first phase shifter between the first phase shifter circuit and the reception switch.

11. The transmit-and-receive module according to claim 10, further comprising:
    a second reception filter; and
    a second phase shifter circuit connected between the second reception filter and the low-noise amplifier, wherein:
    the low-noise amplifier amplifies a second received signal in a second reception band,
    the second reception filter passes frequencies in the second reception band, the reception switch is configured to selectively connect the low-noise amplifier to the first reception filter or to the second reception filter, and the correction circuit does not output the canceling signal to an output node of the second phase shifter circuit.

* * * * *